(12) United States Patent
Liu et al.

(10) Patent No.: US 7,544,242 B2
(45) Date of Patent: Jun. 9, 2009

(54) EFFECTIVE USE OF DISPERSANTS IN WALLBOARD CONTAINING FOAM

(75) Inventors: Qingxia Liu, Vernon Hills, IL (US); Michael P. Shake, Johnsburg, IL (US); David R. Blackburn, Barrington, IL (US); Stewart Hinshaw, Pearland, TX (US)

(73) Assignee: United States Gypsum Company, Chicago, IL (US)

( * ) Notice: Subject to any disclaimer, the term of this patent is extended or adjusted under 35 U.S.C. 154(b) by 222 days.

(21) Appl. No.: 11/450,122

(22) Filed: Jun. 9, 2006

(65) Prior Publication Data

US 2006/0278129 A1    Dec. 14, 2006

(51) Int. Cl.
*C04B 7/02*      (2006.01)
*C04B 7/04*      (2006.01)

(52) U.S. Cl. .................. 106/661; 106/667; 106/670; 106/671; 106/672; 106/674; 106/677; 106/678; 106/772; 106/778; 106/783; 106/785; 106/788; 106/682

(58) Field of Classification Search ................ 106/661, 106/667, 670, 671, 672, 674, 677, 678, 680, 106/772, 778, 781, 783, 785, 788, 682
See application file for complete search history.

(56) References Cited

U.S. PATENT DOCUMENTS

| | | | |
|---|---|---|---|
| 4,028,125 A | 6/1977 | Martin | |
| 4,202,857 A | 5/1980 | Lowe | |
| 4,222,984 A * | 9/1980 | Ladwig | ............ 264/261 |
| 4,238,239 A | 12/1980 | Brown | |
| 4,341,560 A | 7/1982 | Saito et al. | |
| 4,561,986 A | 12/1985 | Villa et al. | |
| 4,666,971 A | 5/1987 | Greenhalgh | |
| 4,814,014 A | 3/1989 | Arfaei | |
| 4,927,463 A | 5/1990 | Kloetzer et al. | |
| 4,960,465 A | 10/1990 | Arfaei | |
| 5,109,030 A | 4/1992 | Chao et al. | |
| 5,118,751 A | 6/1992 | Schulze et al. | |
| 5,223,036 A | 6/1993 | Koyata et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,401,798 A | 3/1995 | Rasp et al. | |
| 5,424,099 A | 6/1995 | Stewart et al. | |
| 5,556,460 A | 9/1996 | Berke et al. | |
| 5,614,017 A | 3/1997 | Shawl | |
| 5,643,978 A | 7/1997 | Darwin et al. | |
| 5,661,206 A | 8/1997 | Tanaka et al. | |
| 5,670,578 A | 9/1997 | Shawl | |
| 5,685,903 A | 11/1997 | Stav et al. | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,834,576 A | 11/1998 | Nagano et al. | |
| 5,858,083 A | 1/1999 | Stav et al. | |
| 5,925,184 A | 7/1999 | Hirata et al. | |
| 5,985,989 A | 11/1999 | Shawl et al. | |
| 6,034,208 A | 3/2000 | McDaniel et al. | |
| 6,043,329 A | 3/2000 | Lepori et al. | |
| 6,150,437 A | 11/2000 | Wutz et al. | |
| 6,166,112 A | 12/2000 | Hirata et al. | |
| 6,187,887 B1 | 2/2001 | Albrecht et al. | |
| 6,211,317 B1 | 4/2001 | Albrecht et al. | |
| 6,264,739 B1 | 7/2001 | Yamato et al. | |
| 6,281,307 B1 | 8/2001 | Muhlebach et al. | |
| 6,294,015 B1 | 9/2001 | Yamashita et al. | |
| 6,376,581 B1 | 4/2002 | Tanaka et al. | |
| 6,527,850 B2 | 3/2003 | Schwartz et al. | |
| 6,620,879 B1 | 9/2003 | Albrecht et al. | |
| 6,783,587 B2 | 8/2004 | Sethuraman et al. | |
| 6,800,129 B2 | 10/2004 | Jardine et al. | |
| 6,800,131 B2 | 10/2004 | Yu et al. | |
| 6,852,159 B2 | 2/2005 | Kinoshita et al. | |
| 6,869,988 B2 | 3/2005 | Schwartz et al. | |
| 7,070,648 B1 | 7/2006 | Schwartz et al. | |
| 2003/0019401 A1 | 1/2003 | Schwartz et al. | |
| 2003/0084980 A1 * | 5/2003 | Seufert et al. | ........... 156/39 |

(Continued)

FOREIGN PATENT DOCUMENTS

EP          0644165          3/1995

(Continued)

*Primary Examiner*—Elizabeth D Wood
(74) *Attorney, Agent, or Firm*—Greer, Burns & Crain, Ltd.; David F. Janci, Esq.; Pradip Sahu, Esq.

(57) ABSTRACT

Effective use of dispersants in wallboard containing foam results from a method where stucco is mixed with a first dispersant and a first quantity of water to form a gypsum slurry. A soap is blended with a second dispersant and a second quantity of water to make a foam. Subsequently, the foam is combined with the slurry. Choice of different first and second dispersants and their relative amounts allows control of the size distribution of the foam bubbles in the slurry and the resulting voids in the gypsum core. Use of the same dispersant in both the mixer and the foam water provides a boost in efficacy of the dispersant.

21 Claims, 1 Drawing Sheet

U.S. PATENT DOCUMENTS

| | | |
|---|---|---|
| 2003/0127026 A1 | 7/2003 | Anderson et al. |
| 2003/0167973 A1 | 9/2003 | Peev et al. |
| 2004/0028956 A1* | 2/2004 | Savoly et al. ............... 428/703 |
| 2004/0045481 A1 | 3/2004 | Sethuraman et al. |
| 2004/0072939 A1 | 4/2004 | Cornman et al. |
| 2004/0092676 A1* | 5/2004 | Savoly et al. ............... 525/535 |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0198873 A1 | 10/2004 | Bury et al. |
| 2004/0211342 A1 | 10/2004 | Sprouts et al. |

FOREIGN PATENT DOCUMENTS

| | | |
|---|---|---|
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

* cited by examiner

EFFECTIVE USE OF DISPERSANTS IN WALLBOARD CONTAINING FOAM

CROSS REFERENCE TO RELATED APPLICATIONS

This application is related to U.S. Ser. No. 11/152,404, entitled "Effective Use of Dispersants in Wallboard Containing Foam", filed Jun. 14, 2005, herein incorporated by reference.

This application is related to co-pending U.S. Ser. No. 11/152,661, entitled "Fast Drying Wallboard"; U.S. Ser. No. 11/152,323, entitled "Method of Making a Gypsum Slurry with Modifiers and Dispersants", U.S. Ser. No. 11/152,317, entitled "Modifiers for Gypsum Products and Method of Using Them" and U.S. Ser. No. 11/152,418, entitled, "Gypsum Products Using a Two-Repeating Unit Dispersant and Method for Making Them", all filed Jun. 14, 2005 and all hereby incorporated by reference.

This application is related to co-pending U.S. Ser. No. 11/450,086, entitled "Method of Making a Gypsum Slurry with Modifiers and Dispersants", U.S. Ser. No. 11/450,068, entitled "Modifiers for Gypsum Products and Method of Using Them" and U.S. Ser. No. 11/449,924, entitled, "Gypsum Products Using a Two-Repeating Unit Dispersant and Method for Making Them", all filed concurrently herewith and all hereby incorporated by reference.

BACKGROUND OF THE INVENTION

This invention relates to a method for controlling the properties of the core when making wallboard. More specifically, it relates to controlling core strength by producing voids of controlled sizes.

Gypsum-based building products are commonly used in construction. Wallboard made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

One reason for the reasonable cost of wallboard panels is that they are manufactured by a process that is fast and efficient. A slurry used to form the core includes calcium sulfate hemihydrate and water that are blended in a mixer. As the slurry exits the mixer, foam generated from soap and water is added to the slurry before it is continuously deposited on a paper facing sheet moving past a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

Installers prefer lightweight boards to reduce fatigue on the job. The foam introduces voids into the gypsum core that reduce the weight, however if the size of the voids is not controlled, problems with the product may develop. Very large bubbles can cause aesthetic problems. Strength is reduced when many small bubbles leave as many tiny voids in the core. Ideally, a distribution of large and small bubbles is desired to produce a board of high strength yet light weight. In addition to affecting the strength and weight of the finished board, mixing foam into the gypsum slurry decreases the fluidity of the slurry.

Dispersants are known for use with gypsum that help fluidize the mixture of water and calcium sulfate hemihydrate to increase the flowability of the slurry. Naphthalene sulfonate dispersants are well known, but have limited efficacy. Polycarboxylate dispersants are commonly used with cements and, to a lesser degree, with gypsum. The addition of one or more dispersants can be used to increase the fluidity when foam is added.

Further, it has been found that the addition of dispersants to a gypsum slurry changes the size distribution of foam bubbles and the voids they leave behind. Some dispersants cause the boards to have an unusual appearance which may be objectionable to the end user. Other dispersants make very tiny bubbles which can decrease the strength.

Dispersants can also retard the set of the gypsum slurry, further complicating high-speed manufacture of gypsum products such as wallboard. If dispersant dose is increased to improve fluidity, set time may increase. If the wallboard is not sufficiently set at the cutting knife, the product will not hold its shape and will be damaged by handling of the board after it is cut. Reduction in the speed of the line may be necessary to allow the board to harden and maintain its shape.

This complex relationship between the dispersant chemistry, foam bubble size and slurry fluidity makes it difficult to produce a gypsum slurry having both the desired bubble size distribution and fluidity without significantly increasing set time. U.S. Pat. No. 6,264,739 assigned to Kao Corporation, discloses the use of a polymeric dispersant for use in wallboard that stabilizes the foam. This reference describes a polyalkylene glycol monoester monomer having 2 to 300 moles of oxyalkylene groups, each having 2 to 3 carbon atoms and an acrylic repeating unit. The only method disclosed for adding the dispersant is by adding the dispersant to the plaster powder together with surfactants. No mention is made of controlling bubble size or bubble size distribution for controlled core structure, only of stabilizing the foam.

U.S. Pat. No. 6,527,850 also describes a gypsum composition utilizing a dispersant formulation that includes an acrylic/polyether comb-branched copolymer. This reference teaches that there may be a second wet portion of the composition that includes the foam, starch, surfactants and glass fiber. In Example 6, the use of a polycarboxylate comb-branched copolymer together with naphthalene sulfonate is revealed. However, it has been found that if polycarboxylate dispersants and naphthalene sulfonate dispersants are mixed together for addition to a slurry mixer, the components may form a gel that is then very difficult to mix homogeneously into the slurry. The combination of dispersants also resulted in a slurry of lower fluidity.

Thus there is a need for a method to effectively utilize foam and dispersants together to obtain a gypsum core that is both strong and lightweight. Further, the method should accomplish this while maintaining the high fluidity and the set time necessary to efficiently make products.

SUMMARY OF THE INVENTION

Solutions to these and other problems are met or exceeded by the current method which consistently produces a fluid slurry from gypsum, a dispersant and foam wherein the bubble size distribution is controlled to produce a mixture of large and small bubbles. Bubble size distribution is controlled without decreasing the slurry fluidity or significantly increasing the set time.

More specifically, in a method of effectively utilizing dispersant in wallboard containing foam, stucco is mixed with a first dispersant and a first quantity of water to form a gypsum slurry. A soap is blended with a second dispersant and a second quantity of water to make a foam. Subsequently, the foam is combined with the slurry. Choice of different first and second dispersants and their relative amounts allows control of the size distribution of the foam bubbles in the slurry and the resulting voids in the gypsum core. Use of the same dispersant in both the mixer and the foam water provides a boost in efficacy of the dispersant.

Selection of different dispersants between the gauge water in the mixer and the foam water allows for increased control in the foam bubble size. Control of bubble size distribution allows a manufacturer to easily produce boards of high strength and light weight, or to balance these properties as needed. The prior art teaches only that use of certain dispersants in wallboard stabilizes the foam used in the wallboard manufacture. There is no teaching or suggestion in any known prior art that there are benefits in adding dispersant in the foam water.

In a second embodiment, the first and second dispersant are the same type of dispersant. In this case, instead of changing the bubble size distribution, an increase in efficacy of the dispersant is obtained. An increase in fluidity is obtained compared to adding the total amount of dispersant to the mixer.

The use of dispersants in this manner results in better slurry fluidity than is accomplished when the total amount of dispersant is added to the mixer. This is true even if the same dispersant is added to the mixer and the foam. Improved slurry fluidity means that the amount of dispersant necessary to achieve acceptable fluidity is less. Maintaining or reducing the total amount of dispersant also reduces the probability that the set time of the slurry will be significantly retarded, leading to difficulties in manufacture.

Further, implementation of this process allows the user greater manufacturing flexibility. By merely changing the dispersant to the foam water or to the mixer, either fluidity or bubble size distribution can be varied. The process changes are obtainable without modifications to existing equipment after pumps and switches are in place. An extra degree of control is added to the process.

DETAILED DESCRIPTION OF THE DRAWINGS

DETAILED DESCRIPTION OF THE INVENTION

Figure 1:
FIG. 1 is a photograph of the core bubble distribution in wallboard made with naphthalene sulfonate dispersant.

Dispersant is added to both the mixing water or gauge water and to the foam water to obtain the benefits of this invention. The two portions of dispersant may be the same dispersant, however, the use of at least two different dispersants is also preferred.

A number of dispersants are useful in this invention. Polycarboxiate dispersants are a preferred type of dispersant. More preferred are polycarboxylic ether dispersants. According to the present invention, one or more dispersants are added to the slurry where a first dispersant is added to a first portion of the water in the mixer, and a second dispersant is added to the foam water. The first dispersant and the second dispersant are optionally the same. Even when the same dispersant is used in the gauge water and the foam water, better fluidity is obtained compared to adding the total amount of dispersant to the gauge water in the mixer.

In one embodiment of this invention, the first dispersant is one of the type that produces small bubbles, such as one of the 2641-Type or PCE211-Type dispersants. Dispersant types are defined and described in more detail below. The second dispersant is a dispersant that destabilizes the foam and creates large bubbles, such as the 1641-Type dispersants or a naphthalene sulfonate dispersant. For example, a PCE211-Type Polymer is preferred for use in the mixer in wallboard manufacture. This polycarboxylic ether has high efficacy and low set time retardation, but it produces a core having very tiny voids. If 10% by weight of the PCE211-Type dispersant is removed, and approximately the same weight of the naphthalene sulfonate dispersant is added to the foam water, a preferred distribution of bubble sizes is obtained.

In another aspect of this embodiment, a first portion of a first dispersant that creates large bubbles, such as a naphthalene sulfonate dispersant is added to the gauge water in the mixer. The second dispersant is a polycarboxylic ether dispersant that creates small bubbles, such as the 2641-Type or PCE211-Type dispersants.

A second embodiment of this invention splits a single dispersant into two portions and utilizes the first portion in the gauge water and the second portion in the foam water. When this embodiment is utilized, there is no control of bubble size, but the efficacy of the dispersant compared to the total amount of dispersant used is increased.

Use of different dispersants in the mixer water and the foam water can be used advantageously. Distribution of bubble size can be optimized by the use of different dispersants to make the slurry and the foam. Some polycarboxylate dispersants added at the mixer have generally been found to result very small foam bubbles when the foam is combined with the gypsum slurry. These include MELFLUX 2641F, MELFLUX 2651F and PCE211-Type dispersants, which are products of Degussa Construction Polymers, GmbH (Trostberg Germany) and are supplied by Degussa Corp. (Kennesaw, Ga.) (hereafter "Degussa"). (MELFLUX is a registered trademark of Deguss Construction Polymers, GmbH.) Other dispersants, including the MELFLUX 1641 by Degussa and naphthalene sulfonate dispersants, destabilize the foam and create very large bubbles. Examples of suitable naphthalene sulfonate dispersants include DILOFLO by GEO Specialty Chemicals, Ambler, Pa. or DAXAD from Dow Chemical Co., Midland, Mich.

One of the preferred polycarboxylic ether dispersants referred to as the "PCE211-Type" used in the slurry includes two repeating units. PCE211-Type dispersants are disclosed in additional detail in U.S. Ser. No. 11/152,418, filed Jun. 14, 2005, entitled, "Gypsum Products Using a Two-Repeating Unit Dispersant and Method for Making Them"; U.S. Ser. No. 11/449,924, filed concurrently herewith and entitled, "Gypsum Products Using a Two-Repeating Unit Dispersant and Method for Making Them"; U.S. Ser. No. 11/152,678, filed Jun. 14, 2005 and entitled "Polyether-Containing Copolymer"; and U.S. Ser. No. 11/152,678, filed Jun. 14, 2005 entitled "Polyether-Containing Copolymer", all previously incorporated by reference.

The first repeating unit is an olefinic unsaturated monocarboxylic acid repeating unit, an ester or salt thereof, or an olefinic unsaturated sulphuric acid repeating unit or a salt thereof. Preferred repeating units include acrylic acid or methacrylic acid. Mono- or divalent salts are suitable in place of the hydrogen of the acid group. The hydrogen can also be replaced by a hydrocarbon group to form the ester.

The second repeating unit satisfies Formula I,

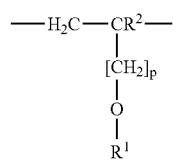

and $R^1$ is derived from an unsaturated (poly)alkylene glycol ether group according to Formula II:

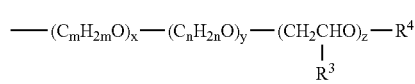

Referring to Formula I, the alkenyl repeating unit optionally includes a $C_1$ to $C_3$ alkyl group between the polymer backbone and the ether linkage. The value of p is an integer from 0-3, inclusive. Preferably, p is either 0 or 1. $R^2$ is either a hydrogen atom or an aliphatic $C_1$ to $C_5$ hydrocarbon group, which may be linear, branched, saturated or unsaturated. Examples of preferred repeating units include acrylic acid and methacrylic acid.

The polyether group of Formula II contains multiple $C_2$-$C_4$ alkyl groups, including at least two different alkyl groups, connected by oxygen atoms. m and n are integers from 2 to 4, inclusive, and preferably, at least one of m and n is 2. x and y are integers from 55 to 350, inclusive. The value of z is from 0 to 200, inclusive. $R^3$ is a non-substituted or substituted aryl group and preferably phenyl and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c).

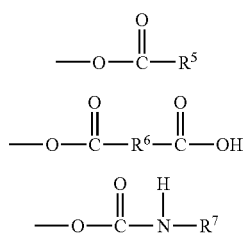

In the above formulas, $R^5$ and $R^7$, independently of each other, represent an alkyl, aryl, aralkyl or alkylaryl group. $R^6$ is a bivalent alkyl, aryl, aralkyl or alkylaryl group.

Polymers of this class are sold by Degussa as the PCE211 Dispersant series. Other polymers in this series known to be useful in wallboard include PCE111 Further teaching of PCE211-Type dispersants are disclosed in U.S. Ser. No. 11/152,678, filed Jun. 14, 2005, entitled "Polyether-Containing Copolymer".

The molecular weight of the dispersant is preferably from about 20,000 to about 60,000 Daltons. Surprisingly, it has been found that the lower molecular weight dispersants cause less retardation of set time than dispersants having a molecular weight greater than 60,000 Daltons. Generally longer side chain length, which results in an increase in overall molecular weight, provides better dispersibility. However, tests with gypsum indicate that efficacy of the dispersant is reduced at molecular weights above 60,000 Daltons.

Other dispersants that are known useful ("2641-Type") are disclosed in U.S. Pat. No. 6,777,517, herein incorporated by reference. Preferably, the dispersant includes at least three repeating units shown in Formula IV(a), IV(b) and IV(c).

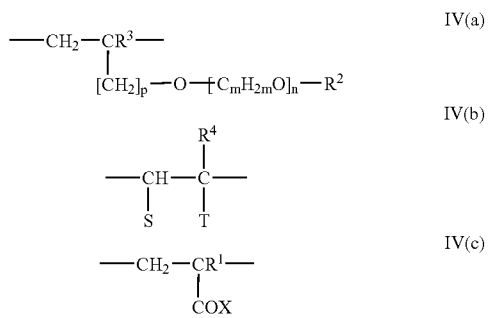

In this case, both acrylic and maleic acid repeating units are present, yielding a higher ratio of acid groups to vinyl ether groups. $R^1$ represents a hydrogen atom or an aliphatic hydrocarbon radical having from 1 to 20 carbon atoms. X represents OM, where M is a hydrogen atom, a monovalent metal cation, an ammonium ion or an organic amine radical. $R^2$ can be hydrogen, an aliphatic hydrocarbon radical having from 1 to 20 carbon atoms, a cycloaliphatic hydrocarbon radical having from 6 to 14 carbon atoms, which may be substituted. $R^3$ is hydrogen or an aliphatic hydrocarbon radical having from 1 to 5 carbon atoms, which are optionally linear or branched, saturated or unsaturated. $R^4$ is hydrogen or a methyl group, depending on whether the structural units are acrylic or methacrylic. P can be from 0 to 3. M is an integer from 2 to 4, inclusive, and n is an integer from 0 to 200, inclusive. Dispersants of this family are sold by Degussa as MELFLUX 2641F, MELFLUX 2651F and MELFLUX 2500 dispersants. The use of 2641-Type dispersants in gypsum slurries is described in U.S. Ser. No. 11/152,661, filed Jun. 14, 2005, entitled "Fast Drying Wallboard", previously incorporated by reference.

Yet another preferred dispersant is sold by Degussa as MELFLUX 1641 ("1641-Type"). This is another dispersant made primarily of two components, as shown in Formula V. This dispersant is made primarily of two repeating units, one a vinyl ether and the other a vinyl ester. In Formula V, m and n are the mole ratios of the component repeating units, which can be randomly positioned along the polymer chain.

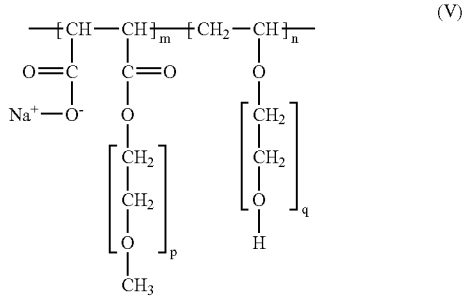

Polymerization of the monomers is carried out by any method known by an artisan. One preferred method of making the polymer is taught in U.S. Pat. No. 6,777,517, hereby incorporated by reference.

These dispersants are particularly well-suited for use with gypsum. While not wishing to be bound by theory, it is believed that the acid repeating units bind to the gypsum crystals while the long polyether chains of the second repeating unit perform the dispersing function. Since it is less retardive than other dispersants, it is less disruptive to the manufacturing process of gypsum products such as wallboard. The dispersant is used in any effective amount. To a large extent, the amount of dispersant selected is dependant on the desired fluidity of the slurry. As the amount of water decreases, more dispersant is required to maintain a constant slurry fluidity. Preferably, the total amount of dispersants used is about 0.01% to about 0.5% based on the dry weight of the stucco. More preferably, the dispersant is used in amounts of about 0.05% to about 0.2% on the same basis. In measuring a liquid dispersant, only the polymer solids are considered in calculating the dosage of the dispersant, and the water from the dispersant is considered when a water/stucco ratio is calculated.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soaps from GEO Specialty Chemicals, Ambler, Pa. Foams and a preferred method for preparing foamed gypsum products are disclosed in U.S. Pat. No. 5,683,635, herein incorporated by reference. If foam is added to the product, the polycarboxylate dispersant is optionally divided between the process water and the foam water prior to its addition to the calcium sulfate hemihydrate.

The gypsum slurry also optionally includes one or more modifiers that enhance the action of the polycarboxylate dispersant. The two-repeating unit dispersant used here is particularly susceptible to the effects of the modifiers. Preferred modifiers include cement, lime, quicklime or calcium oxide, slaked lime, also known as calcium hydroxide, soda ash, also known a sodium carbonate, potassium carbonate, also known as potash, and other carbonates, silicates, phosphonates and phosphates. When modifiers are used, the efficacy of the dispersant is boosted to achieve a new level of fluidity, or the amount of polycarboxylate dispersant can be decreased to reduce the polycarboxylate expense. Additional information on modifiers and their use is found in U.S. Ser. No. 11/152,317 entitled "Modifiers For Polycarboxylate Dispersants." filed Jun. 14, 2005 and previously incorporated by reference.

The modifiers are used in the gypsum slurry in any suitable amount. Preferably, the modifiers are used in amounts from about 0.01% to about 2% by weight based on the dry stucco. More preferably, the modifiers are used in amounts of about 0.03% to about 0.5% and even more preferably, from about 0.05% to about 0.5%.

Water is added to the slurry in any amount that makes a flowable slurry. The amount of water to be used varies greatly according to the application with which it is being used, the exact dispersant being used, the properties of the stucco and the additives being used. The water to stucco ratio ("WSR") for wallboard is preferably about 0.1 to about 0.8 based on the dry weight of the stucco. Commonly, a WSR of about 0.2 to about 0.6 is preferred. Flooring compositions preferably use a WSR from about 0.17 to about 0.45, preferably from about 0.17 to about 0.34. Moldable or castable products preferably use water in a WSR from about 0.1 to about 0.3, preferably from about 0.16 to about 0.25. The WSR can be reduced to 0.1 or less in laboratory tests based on the moderate addition of the PCE211-Type dispersants.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

It has been discovered that if the stucco is exposed to the dispersant before the modifier is exposed to the dispersant, then the modifier is rendered less effective. Preferably the modifier and the dispersant are both predissolved in the gauge water, forming a solution. The modifier and the dispersant are added in any order, either sequentially or essentially simultaneously. After the solution is formed, the stucco is mixed with the solution, exposing the stucco to both the dispersant and the modifier simultaneously. When both the modifier and dispersant are in dry form, they can be mixed together and added with the dry stucco. The preferred method for combining a modifier, dispersant and stucco is further described in U.S. Ser. No. 11/152,323, entitled "Method of Making a Gypsum Slurry with Modifiers and Dispersants", previously incorporated by reference.

In another embodiment, the modifier is mixed with a portion of the gauge water to form a modifier slurry. The modifier slurry is then mixed with the remaining gauge water and the dispersant, either simultaneously or sequentially, to form the three-component solution. In either case, both the modifier and the dispersant are blended in the gauge water prior to introduction of the dry components.

The stucco, also known as calcium sulfate hemihydrate or calcined gypsum, is present in amounts of at least 50% of the dry materials. Preferably, the amount of stucco is at least 80%. In many wallboard formulations, the dry component material is more than 90% or even 95% calcium sulfate hemihydrate. The method of calcination is not important, and either alpha or beta-calcined stucco is suitable. Use of calcium sulfate anhydrite is also contemplated, although it is preferably used in small amounts of less than 20%.

Stuccos from different sources include different amounts and types of salt and impurities. The slurry of this invention is less effective when the stucco has high concentrations of naturally occurring salts. Low-salt stuccos are defined as those having soluble salts of less than 300 parts per million. High salt content stuccos that include those having at least 600 parts per million soluble salts are most likely to interfere with the action of the modifier. Gypsum deposits from Southard, Okla., Little Narrows, Nova Scotia, Fort Dodge, Iowa, Sweetwater, Tex., Plaster City, Calif. and many other locations meet this preference.

In some embodiments of the invention, additives are included in the gypsum slurry to modify one or more properties of the final product. Additives are used in the manner and amounts as are known in the art. Frequently these and other additives are in solid, powder or granular form and are added to the dry components before the slurry is mixed. Concentrations are reported in amounts per 1000 square feet of finished board panels ("MSF").

Starches are used in amounts from about 3 to about 20 lbs./MSF (14.6 to 97.6 $g/m^2$) to increase the paper bond and strengthen the product. Glass fibers are optionally added to the slurry in amounts of up to 11 lb./MSF (54 $g/m^2$). Up to 15 lb./MSF (73.2 $g/m^2$) of paper fibers are also added to the slurry. Wax emulsions are added to the gypsum slurry in amounts up to 90 lb./MSF (0.439 $kg/m^2$) to improve the water-resistency of the finished gypsum board panel.

A trimetphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate looses its ability to strengthen the product and the slurry becomes severely retardive.

Other additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 $g/m^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 $g/m^2$) to increase the paper bond and strengthen the product. Glass fibers are optionally added to the slurry in amounts of at least 11 lb./MSF (54 $g/m^2$). Up to 15 lb./MSF (73.2 $g/m^2$) of paper fibers are also added to the slurry. Wax emulsions are added to the gypsum slurry in amounts up to 90 lb./MSF (0.4 $kg/m^2$) to improve the water-resistency of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soap products from GEO Specialty Chemicals, Ambler, Pa. Foams and a preferred method for preparing foamed gypsum products are disclosed in U.S. Pat. No. 5,683,635, herein incorporated by reference.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 Starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations.

In operation, the stucco is moved toward a mixer. Prior to entry into the mixer, dry additives, such as starches, or set accelerators, are added to the powdered stucco. Some additives are added directly to the mixer via a separate line. Trimetaphosphate was added using this method in the examples described below. Other additives may also be added to the water. This is particularly convenient where the additives are in liquid form. For most additives, there is no criticality regarding placing the additives in the slurry, and they may be added using whatever equipment or method is convenient.

However, when using the dispersant according to this invention, it is important to add the first portion of the dispersant to the water prior to addition of the stucco. Gauge water or make-up water is added at the mixer a rate needed to meet the target water to stucco ratio when water from other sources has been taken into account. If one or more modifiers are being used, the modifier is also added to the water prior to stucco addition. After the first portion of the dispersant and the modifier are combined, the stucco is added to the resulting solution.

Meanwhile, foam is generated by combining the soap, the second portion of dispersant and the second water portion. The foam is then injected into the moving gypsum slurry after it exits from the mixer through a hose or chute. The foam ring is an apparatus having multiple ports that are arranged in a ring perpendicular to the axis of the hose so that foam is forced under pressure into the gypsum slurry as it passes by the foam ring.

After the foam and the slurry have been brought together, the resulting slurry moves toward and is poured onto a conveyor lined with one facing material. A piece of facing material is placed on top of the slurry, forming a sandwich with the slurry between the two facing materials. The sandwich is fed to a forming plate, the height of which determines the thickness of the board. Next the continuous sandwich is cut into appropriate lengths at the cutting knife, usually eight feet to twelve feet.

The boards are then moved to a kiln for drying. Temperatures in the kiln typically range to 450° F. to 500° F. maximum. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

In the examples that follow, slump tests were used to measure the fluidity of the sample, while stiffening and Vicat set times were used to compare the set times of the various compositions. All dry components were weighed and dry blended together. Dry components were delivered to the mixer via a loss-in-weight feeder for accuracy. The liquid components were weighed for accurate formulation and metered into the continuous mixer with a peristaltic pump.

The slurry sample was poured into a 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter.

Draw a 300 g Vicat needle through the slurry patty in a vertical position. Continue this procedure until the time at which the slurry fails to close the groove behind the needle as it is pulled through the mass. Report the stiffening time from the time when the slurry was first collected from the mixer discharge.

References to set time refer to Vicat set time per ASTM C-472, herein incorporated by reference. The Vicat set time started from the time the when the slurry was first collected from the mixer discharge.

EXAMPLE 1

A liquid polycarboxylate dispersant was divided between the foam water and gauging water. A total of fourteen grams of the liquid dispersant was added as shown in Table 1. The dispersant was 40% solids and 60% water. A dry CSA accelerator was added to the stucco at the rate of 0.20% based on the dry stucco. Foam was made from 1% PFM Soap added to water and the amount of liquid dispersant shown in Table 1. Taking into account the water present in the dispersant, a total of 148 grams of water was used to make the foam.

The liquid dispersant was added to the gauging water according to Table 1 to make a total of 852 grams of water. To the liquid, the stucco was added and blended to make a homogenous slurry. Foam was added to the slurry. Tests were conducted on the resulting slurry, the results of which are shown in Table I.

TABLE 1

| | Dispersant Split | | | |
| --- | --- | --- | --- | --- |
| | 100/0 | 85/15 | 74/26 | 65/35 |
| PCE in Mixer | 14.0 | 11.9 | 10.3 | 9.1 |
| PCE in Foam | 0 | 2.1 | 3.6 | 4.9 |
| Slump, In. | 6.75 | 8 | 7.25 | 7.25 |
| Stiffening | 4.25 | 3.5 | 3.5 | 2.45 |
| Vicat Set | * | 9.5 | 6.1 | 6.5 |

* Data not available

When 15% of the dispersant was added to the foam water, the fluidity increased dramatically, as evidenced by the increase in patty size of that sample. Although less dramatic than at 15%, increase in patty size is also observed when 26% and 35% of the dispersant is added to the foam water.

EXAMPLE 2

In a commercial trial, two different dispersants were added to the mixer and/or the foam water. The plant was running 1795 pounds (7989 kg) of stucco per MSF of board. Wet gypsum accelerator and HRA were added in the amounts shown in Table II to maintain 50% set at the cutting knife. Table II also shows the types and amounts of dispersants added, as well as the slump and observations as to bubble distribution. The amount of dispersant reported in Table II are based on the dry weight of the stucco. Set accelerator is reported in lbs/MSF (g/m$^2$).

TABLE II

| | Sample | | | | | |
|---|---|---|---|---|---|---|
| | L | M | N | O | P | Q |
| 211 in Mixer | 0.125 | 0.15 | 0.15 | 0.20 | 0.0 | 0.0 |
| NS in Mixer | 0.0 | 0.0 | 0.0 | 0.0 | 0.14 | 0.12 |
| NS in Foam | 0.0 | 0.0 | 0.023 | 0.035 | 0.0 | 0.0 |
| WGA | 42 (185) | 42 (185) | 42 (185) | 42.4 (186) | 38 (167) | 37.8 (166) |
| HRA | 4 (17.6) | 6 (26.4) | 6 (26.4) | 10 (44) | 0 | 4 (17.6) |
| Total Water | 1051 lb (478 kg) | 1012 lb (460 kg) | 1012 lb (460 kg) | 900 lb (409 kg) | 1181 lb (537 kg) | 1173 lb (587 kg) |
| Slump | 7" (17.8 cm) | 6.5" (16.5 cm) | 6.5" (16.5 cm) | 6.75" (17.1 cm) | 7.375" (18.7 cm) | 8.25" (21.0 cm) |
| Bubbles | Small, Uniform | Small, Uniform | Size Distribution | Size Distribution | Size Distribution | Size Distribution |

Figure 2:
FIG. 2 is a photograph of the core bubble distribution in wallboard made with polycarboxylate dispersant.
Figure 3:
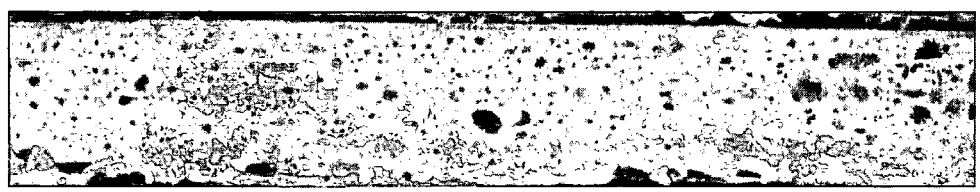
FIG. 3 is a photograph of the core bubble distribution in wallboard of the present invention using naphthalene sulfonate in the foam water and a polycarboxylate dispersant in the gauge water in the mixer.
Figure 4:
FIG. 4 shows very large bubbles that are formed when naphthalene sulfonate dispersant is used in high dosages.

In this commercial test, two different dispersant types were used in the mixer and the foam water and the boards produced were cut open to inspect the size of the bubbles in the core. Samples L and M use a polycarboxylate dispersant in the mixer only. As shown in FIG. 2, the bubbles formed are small and nearly uniform in size. Naphthalene sulfonate dispersant was added to the foam water in samples N and O, changing the bubble size distribution as shown in FIG. 3. When naphthalene sulfonate was added to the mixer only in samples P and Q, bubble size distribution again changed, similar to that shown in FIG. 1. The wallboard core of FIG. 4 was made using the same components and same method as samples P and Q, except that the naphthalene sulfonate was added at a dosage of 0.21%.

EXAMPLE 3

The effect of splitting a dispersant between the mixer and the foam water was further studied in a plant trial. A liquid polycarboxylate dispersant, MELFLUX 2500L ("2500L"), was added to the mixer or the foam water as specified in Table III. The dispersant amount is reported on a solids basis, while the water included with the liquid dispersant was taken into account in calculating the total water present in the slurry. Stucco was utilized at a rate of 1235 pounds/MSF. The amount and placement of the dispersant is shown in Table III, together with the total amount of water added, accelerants used, and the product slump.

TABLE III

| | Sample ID | |
|---|---|---|
| | X | Y |
| 2500 L in Mixer | 0.153% | 0.12% |
| 2500 L in Foam Water | 0.0 | 0.04% |
| HRA usage | 35 lb (16 kg) | 33 lb (15 kg) |
| Total Water | 862 lb (392 kg) | 826 lb (375 kg) |
| Slump | 7" (17.8 cm) | 7.25" (18.4 cm) |

Comparison of these trial runs confirms the increase in fluidity when the same dispersant is split between the mixer and the foam water, even when the total amount of dispersant is substantially the same. Even with a decrease in gauging water of 36 lbs/MSF, there was an increase in the patty size from the slump test.

While a particular embodiment of the method of controlling the distribution of foam bubble size in a gypsum slurry has been shown and described, it will be appreciated by those skilled in the art that changes and modifications may be made thereto without departing from the invention in its broader aspects and as set forth in the following claims.

What is claimed is:

1. A method of utilizing foam and dispersant in a gypsum slurry comprising:
   mixing stucco, a first dispersant and a first quantity of water to form a gypsum slurry,
   blending a soap, a second dispersant and a second quantity of water to make a foam, and
   combining the foam with the slurry.

2. The method of claim 1 wherein the first dispersant and the second dispersant are the same dispersant.

3. The method of claim 1 wherein the first dispersant is a polycarboxylic ether dispersant and the second dispersant is a naphthalene sulfonate dispersant.

4. The method of claim 1 wherein the first dispersant is a naphthalene sulfonate dispersant and the second dispersant is a polycarboxylic ether dispersant.

5. The method of claim 1 where the second dispersant is a polycarboxylic ether dispersant comprising vinyl ether repeating unit comprising at least one of the group consisting of maleic acid, maleic anhydride their esters and salts.

6. The method of claim 1 where the second dispersant destabilizes the foam to create larger bubbles.

7. The method of claim 1 wherein the amount of the second dispersant is about 10% to about 15% by weight of the total weight of the first dispersant and the second dispersant.

8. The method of claim 1 wherein said combining Step comprises introducing foam into the slurry through a foam ring.

9. The method of claim 1 wherein said mixing step comprises adding the first dispersant and a modifier to the first quantity of water to form a solution prior to adding the stucco to the solution.

10. The method of claim 9 wherein the modifier is at least one selected from the group consisting of cement, lime, silicates, carbonates and phosphates.

11. A method of effectively utilizing dispersants in a gypsum wallboard core comprising:
    mixing stucco, a first dispersant and a first quantity of water to form a gypsum slurry,
    blending a soap, a second dispersant and a second quantity of water to make a foam,
    combining the foam with the slurry,
    pouring the slurry onto a facing material, shaping the slurry into a panel, and allowing the gypsum slurry to set, forming the wallboard core.

12. The method of claim 11 wherein the first dispersant and the second dispersant are the same dispersant.

13. The method of claim 11 wherein the first dispersant is a polycarboxylic ether dispersant and the second dispersant is a naphthalene sulfonate dispersant.

14. The method of claim 11 wherein the first dispersant is a naphthalene sulfonate dispersant and the second dispersant is a polycarboxylic ether dispersant.

15. The method of claim 11 wherein the mixing step further comprises mixing the first dispersant, the first quantity of water and a modifier.

16. The method of claim 15 wherein the modifier is at least one selected from the group consisting of cement, lime, silicates, carbonates and phosphates.

17. The method of claim 11 wherein the amount of the second dispersant is about 10% to about 15% by weight of the total weight of the first dispersant and the second dispersant.

18. The method of claim 1 further comprising exiting of the gypsum slurry from the mixer and wherein said combining step takes place after said exiting step.

19. The method of claim 11 further comprising exiting of the gypsum slurry from the mixer and wherein said combining step takes place after said exiting step.

20. The method of claim 1 wherein the amount of the second dispersants is from about 15% to about 35%.

21. The method of claim 11 wherein the amount of the second dispersants is from about 15% to about 35%.

* * * * *

UNITED STATES PATENT AND TRADEMARK OFFICE
CERTIFICATE OF CORRECTION

PATENT NO. : 7,544,242 B2  Page 1 of 1
APPLICATION NO. : 11/450122
DATED : June 9, 2009
INVENTOR(S) : Qingxia Liu et al.

It is certified that error appears in the above-identified patent and that said Letters Patent is hereby corrected as shown below:

On the Title Page

Please insert the following U.S. Priority Data:

Item
 -- Related U.S. Application Data
(60) U.S. Application No. 11/152,404, filed on June 14, 2005. --

Signed and Sealed this

Twelfth Day of October, 2010

David J. Kappos
*Director of the United States Patent and Trademark Office*